UNITED STATES PATENT OFFICE.

JOSEPH MORHARD, OF SAN FRANCISCO, CALIFORNIA, ASSIGNOR OF ONE-HALF TO CHARLES W. MOTT, OF SAME PLACE.

COMPOSITION OF MATTER FOR SEWER OR WATER PIPES, &c.

SPECIFICATION forming part of Letters Patent No. 568,318, dated September 22, 1896.

Application filed July 29, 1895. Serial No. 557,420. (No specimens.)

*To all whom it may concern:*

Be it known that I, JOSEPH MORHARD, a subject of the Emperor of Germany, (having declared my intention to become a citizen of the United States,) residing at San Francisco, in the county of San Francisco and State of California, have invented certain new and useful Improvements in Composite Materials; and I do declare the following to be a full, clear, and exact description of the invention, such as will enable others skilled in the art to which it appertains to make and use the same.

My invention relates to compositions of matter for forming sewer and water pipes and other articles; and it consists in a composition of matter made up of very cheap and easily-obtainable ingredients, and one which will harden quickly and which when hardened will be capable of resisting the action of water and will not be liable to decay or disintegrate.

The invention also consists in a simple process of making the composition, as will be hereinafter understood.

My improved composition consists of sulfur, asphaltum, and a base of vegetable matter, such as sea-grass, straw, leaves, wood fibers, or sawdust, all of which are exceedingly cheap and easily obtainable. I prefer to combine the ingredients in the proportions of sixty (60) per cent. of vegetable matter to twenty-five (25) per cent. of sulfur and fifteen (15) per cent. of asphaltum. In other words, I form three-fifths of the composition of the exceedingly-cheap vegetable matter specified, and as such matter is easily obtainable in all localities it will be seen that my improved composition may be produced at a very slight cost.

In carrying out my invention and forming my improved composition I first place the specified proportion of sulfur in a suitable vessel and heat the vessel by any suitable means sufficiently to melt the sulfur. I then place on the sulfur the specified proportion of vegetable matter and stir the same together and at the same time increase the temperature to the degree at which water boils, after which I add the specified proportion of asphaltum to the mass. When this has been done, the composition is permitted to cool and is then ready to be cast or molded in any desired shape.

In virtue of the sulfur being heated sufficiently to melt it before the vegetable base is added burning of the vegetable base is obviated, and burning of said base is also effectually prevented by the stirring of the mass during the increase of temperature to the boiling-point. The high heating of the sulfur and vegetable base results in their being thoroughly combined, and the addition of the asphaltum while the sulfur and vegetable base are highly heated results in the three ingredients being thoroughly commingled and renders the mass thoroughly homogeneous, which is highly desirable, and this without damaging the asphaltum or the other ingredients by the high heat.

A composition such as described, when cool, will be capable of resisting strain and the action of water and other liquids and will not be liable to decay or disintegrate, which is an important desideratum. Such a composition is also very cheap, as all of the ingredients are easily obtainable and no expensive plant is necessary to mingle them.

My improved composition is designed more especially for forming sewer and water pipes, for which purpose it is especially adapted; but, as is obvious, it may be used to advantage for forming any other articles for which it is suitable.

Having described my invention, what I claim is—

1. The herein-described composition of matter to be used for forming water and sewer pipes and other articles, consisting essentially of the vegetable-matter base, and sulfur and asphaltum combined in the proportions specified and forming a homogeneous mass, as specified.

2. The herein-described process of manufacturing composite material consisting in heating sulfur sufficiently to melt it, then adding a base of vegetable matter to the sulfur and mixing the same and gradually increasing the heat of the mixture to about the degree necessary to boil water, then adding asphaltum to the mixture, and then permitting the mixture to cool, as set forth.

In testimony whereof I affix my signature in presence of two witnesses.

JOSEPH MORHARD.

Witnesses:
WALTER N. KEMPSTON,
JAMES L. KING.